US008223379B2

(12) United States Patent
Biundo et al.

(10) Patent No.: US 8,223,379 B2
(45) Date of Patent: Jul. 17, 2012

(54) PRINTERS AND PRINTER SYSTEMS HAVING CELLULAR INPUT/OUTPUT

(75) Inventors: Marc Biundo, Vancouver, WA (US); Brett Graves, Vancouver, WA (US); John H. Oleinik, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/093,466

(22) Filed: Apr. 25, 2011

(65) Prior Publication Data

US 2011/0242604 A1 Oct. 6, 2011

Related U.S. Application Data

(62) Division of application No. 10/428,610, filed on May 2, 2003, now Pat. No. 7,957,014.

(51) Int. Cl.
*G06F 15/00* (2006.01)
*H04B 1/00* (2006.01)

(52) U.S. Cl. ...................................... 358/1.15; 455/557

(58) Field of Classification Search ................. 358/1.15, 358/1.13, 1.14, 1.18, 1.16, 468, 402, 444; 455/557, 551, 41.1, 552.1, 420, 418, 419, 455/3.03, 70; 709/203, 204, 207, 218; 705/1, 705/2, 52
See application file for complete search history.

(56) References Cited

U.S. PATENT DOCUMENTS

| | | | |
|---|---|---|---|
| 2002/0035546 A1* | 3/2002 | Aoki | 705/52 |
| 2002/0091570 A1* | 7/2002 | Sakagawa | 705/14 |
| 2003/0038963 A1 | 2/2003 | Yamaguchi | |
| 2003/0093675 A1 | 5/2003 | Hibino et al. | |
| 2003/0203744 A1* | 10/2003 | Otsuka | 455/551 |
| 2003/0217103 A1* | 11/2003 | Yamamoto et al. | 709/203 |
| 2004/0066530 A1 | 4/2004 | Wu et al. | |
| 2004/0185882 A1 | 9/2004 | Gecht et al. | |
| 2007/0173266 A1 | 7/2007 | Barnes, Jr. | |

* cited by examiner

*Primary Examiner* — Saeid Ebrahimi Dehkordy

(57) ABSTRACT

A method includes accessing a cellularly configured printer with a cellular device; and cellularly sending the printer an indication of a resource that is to be printed by the printer, said resource comprising a network-accessible resource that does not reside on the printer and which the printer is to retrieve.

3 Claims, 3 Drawing Sheets

PRINTERS AND PRINTER SYSTEMS HAVING CELLULAR INPUT/OUTPUT

RELATED APPLICATIONS

This application is a divisional of, and claims priority under 35 U.S.C. §120 from, U.S. patent application Ser. No. 10/428,610, filed May 2, 2003, now U.S. Pat. No. 7,957,014 entitled "Printers and printer systems having cellular input/output," now allowed, which application is incorporated herein by reference in its entirety.

BACKGROUND

In today's printing environment, to make a printer's functionality available to a number of different people, the printer is often incorporated into a computing network using various hard line network connections. For example, a printer in a business environment, such as an office, typically has a network port with a cable physically connected to it. The cable typically runs to or accesses a network server. Each person who desires to print on such a printer from their desktop computer typically accesses the printer via a network cable that runs from their computer to a network connection that accesses the network server. Unfortunately, this paradigm for printer use is limited and does not fully expose the printer's functionalities to all of those who might desire to use them.

SUMMARY

In one embodiment, a system comprises a printer configured to provide one or more print services, one or more processors associated with the printer, and a cellular interface associated with the printer and through which one or more print services can be accessed by a cellular phone. One or more computer-readable media are associated with the printer, and computer-readable instructions on the computer-readable media are executable by the processor(s) to cause the processor(s) to enable the printer to be accessed by a cellular phone and provide one or more print services for a user of the cellular phone.

In another embodiment, a method comprises accessing a cellularly configured printer with a cellular device, and cellularly sending the printer an indication of a resource that is to be printed by the printer, where the resource comprises a network-accessible resource that does not reside on the printer and which the printer is to retrieve.

In yet another embodiment, a method comprises accessing a cellularly configured printer by calling the printer with a cellular phone, and cellularly sending the printer an indication of a resource that is to be printed by the printer. The indication comprises an identifier that can be used to retrieve the resource via the Internet.

In a further embodiment, a method comprises receiving, with a printer, a cellular communication from a cellular device that provides an indication of a resource that is to be printed by the printer. A network via which the resource can be retrieved is accessed with the printer and the indication is used to retrieve the resource via the network and print the resource.

In another embodiment, a method comprises offering at least a portion of a cellular-based service for a fee, the cellular-based service comprising a service in which one or more cellularly-configured printers can be: cellularly accessed by a cell phone, provided with an indication of a resource that is to be printed, retrieve the resource, and print the resource. The method further comprises charging a fee for the cellular-based service portion.

In another embodiment, a printer comprises a cellular interface, a computer readable medium storing instructions for operating the printer including communicating with other devices through the cellular interface, a processor for executing instructions stored on the computer readable medium, and a print unit operatively coupled to the processor.

In a further embodiment, a printer comprises a cellular interface, a web server configured to communicate with other devices through the cellular interface, a computer readable medium storing instructions for operating the printer including communicating with other devices through the web server and the cellular interface, a processor for executing instructions stored on the computer readable medium, and a print unit operatively coupled to the processor.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Overview

Various methods and systems described below provide a printer or printing device that is networked via a cellular I/O port. By having a printer cellularly networked, the printer can be employed in a number of different scenarios and for a number of different purposes that greatly enhance the printer's utility and, in turn, the user's experience. Some specific examples of scenarios are provided below.

Figure 1:
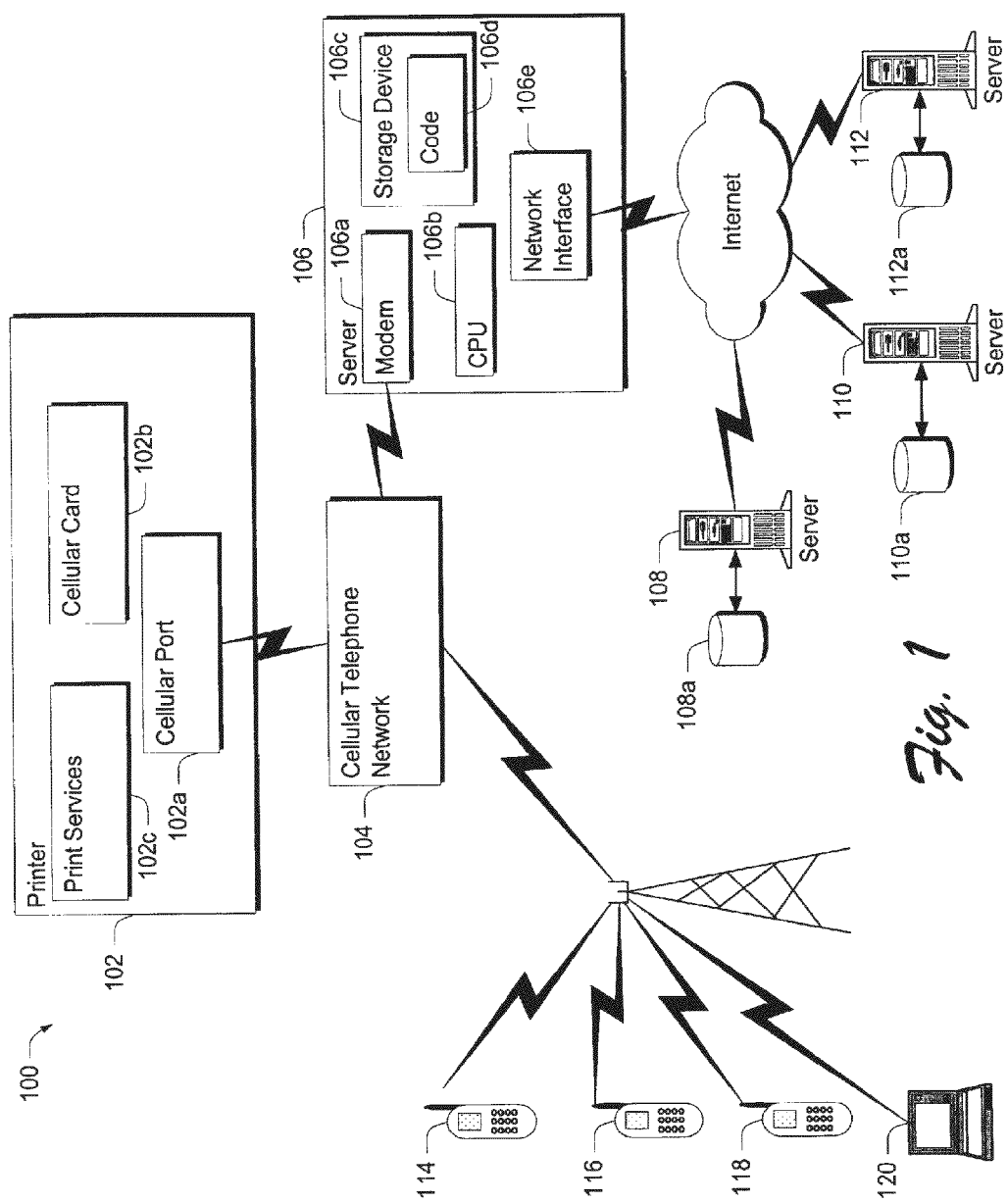
FIG. 1 is a block diagram of an exemplary system with which various embodiments can be utilized.

FIG. 1 shows an exemplary system generally at 100 that includes, as some exemplary components, a printer 102, a cellular telephone network 104, a server 106, and various Internet-accessible servers 108, 110, and 112 having associated resources 108a, 110a, and 112a respectively.

In one embodiment, printer 102 comprises a cellular port 102a, a cellular card 102b and one or more print services 102c. The cellular port 102a can comprise any suitable cellular port and cellular card 102b comprises the hardware, software and firmware that imparts cellular functionality to the printer. Cellular card 102b can contain a cellular modem via which cellular network 104 can be accessed. Such cellular componentry is known and, for the sake of brevity, is not described in detail here. The cellular componentry associated with the printer 102 provides the capability to cellularly network the printer. In this example, the cellular componentry is illustrated as residing inside the printer. It is to be appreciated and understood that such componentry need not reside inside the printer. Rather, some of the componentry that imparts cellular functionality to the printer can reside externally of the printer.

Cellular telephone network 104 can comprise any suitable cellular telephone network. The operation and function of cellular telephone networks are known and for the sake of brevity are not described in additional detail here.

Server 106 comprises, in this embodiment, a cellular modem 106a that enables the server to cellularly communicate with the printer 102. Additionally, the server can include a CPU 106b, a storage device 106c having software code 106d that is executable by the CPU to impart to the server the functionality that is described herein. Further, the server 106 can include a network interface 106e that enables the server to access networks such as the Internet. Any suitable network interface can be utilized in connection with any suitable network protocol and hence, any suitable network.

Individual Internet-accessible servers 108, 110, and 112 comprise standard servers that can be utilized to access a variety of resources that are represented at 108a, 110a, and 112a respectively. In addition to cellularly accessing servers 108, 110, and 112, it is possible for printer 102 to more conventionally access the same or similar servers using, for example, a DSL connection or the like.

In the presently-described embodiment, a number of user devices can be used to access printer 102 via cellular network 104. For example, cellular phones 114, 116, and 118 can be used to access printer 102 via cellular network 104. Further, user computing devices such as lap top computer 120 can be used to access printer 102 via the cellular network. Specific examples of access scenarios and various exemplary business models that can be utilized to partake of print services 102c are described below.

Exemplary Printer System

Figure 2:
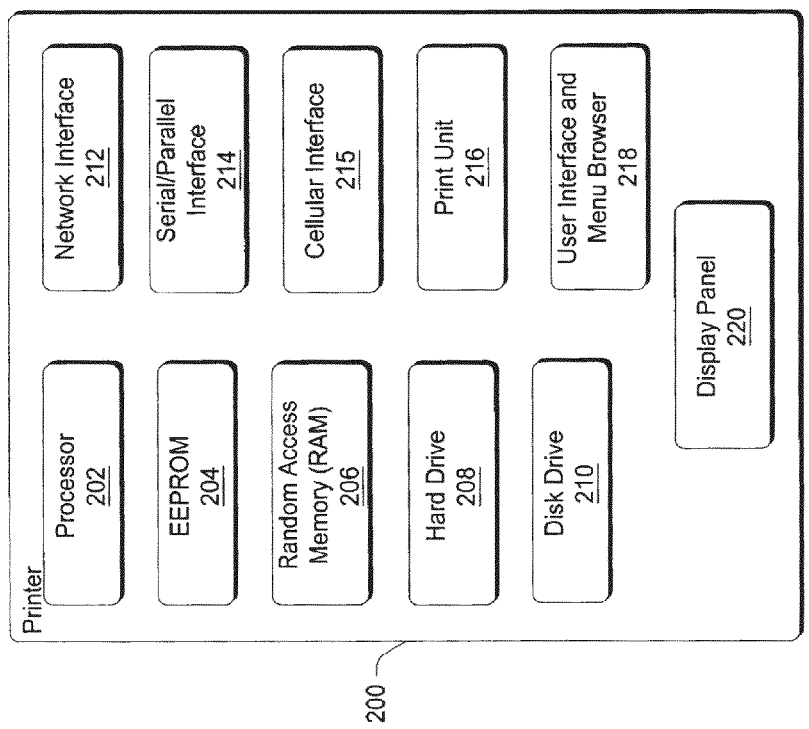
FIG. 2 is a block diagram of an exemplary system that can be utilized to implement one or more embodiments.

FIG. 2 is a block diagram showing exemplary components of a printing device in the form of a printer 200 that can be used in accordance with the described embodiments. The term "printer" and "printing device" are used interchangeably in this document and, as used, will be understood to include multi-function devices that, in addition to printing, perform additional functions. Such additional functions can include, without limitation, one or more of the following: faxing, copying, scanning and the like.

Printer 200 includes a processor 202 and at least one computer-readable media. In this example, the computer readable media can include an electrically erasable programmable read-only memory (EEPROM) 204 and a random access memory (RAM) 206. Further, the computer-readable media can include hard drive 208. Processor 202 processes various instructions necessary to operate the printer 200 and communicate with other devices. EEPROM 204, RAM 206, and/or hard drive 208 can store various information such as configuration information, fonts, templates, data being printed, and menu structure information.

In addition, although not shown in FIG. 2, a particular printer may also contain a ROM (non-erasable) in place of or in addition to EEPROM 204. Furthermore, a printer may alternatively contain a flash memory device in place of or in addition to EEPROM 204.

Printer 200 can also include a disk drive 210, a network interface 212, and a serial/parallel interface 214. In accordance with one embodiment, the printer comprises a cellular interface 215 that can enable the printer to be cellularly networked. The cellular interface can include components such as cellular port 102a and cellular card 102b (FIG. 1).

Disk drive 210 provides additional storage for data being printed or other information used by the printer 200. Although both RAM 206 and disk drive 210 are illustrated in FIG. 2, a particular printer may contain either RAM 206 or disk drive 210, depending on the storage needs of the printer. For example, an inexpensive printer may contain a small amount of RAM 206 and no disk drive 210, thereby reducing the manufacturing cost of the printer.

Network interface 212 provides a connection between printer 200 and a data communication network. Network interface 212 allows devices coupled to a common data communication network to send print jobs, menu data, and other information to printer 200 via the network. The network interface can be embodied as a network server and, more particularly, as a Web server. As a network server or Web server, the network interface can enable a user to access the printer using standard network protocols. For example, as a Web server, the network interface can enable two-way communication with one or more clients via standard network protocols such as TCP/IP.

Serial/parallel interface 214 can also provide a data communication path directly between printer 200 and another device, such as a workstation, server, or other computing device.

Printer 200 also includes a print unit 216 that includes mechanisms that are arranged to selectively apply ink (e.g., liquid ink, toner, etc.) to a print media (e.g., paper, plastic, fabric, etc.) in accordance with print data within a print job. Thus, for example, print unit 216 can include a conventional laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner. Print unit 216 can also be configured to support duplex printing, for example, by selectively flipping or turning the print media as required to print on both sides. The print unit 216 can also comprise an ink jet print unit that utilizes principles of ink jet printing. Those skilled in the art will recognize that there are many different types of print units available, and that for the purposes of the present discussion, print unit 216 can include any of these various types.

Printer 200 can also contain a user interface/menu browser 218 and a display panel 220. User interface/menu browser 218 allows the user of the printer to navigate the printer's menu structure. User interface 218 may be a series of buttons, switches or other indicators that are manipulated by the user of the printer. Display panel 220 is a graphical display that provides information regarding the status of the printer and the current options available through the menu structure.

The illustrated printer can, and typically does include software that provides a runtime environment in which software applications or applets can run or execute. The runtime environment can facilitate the extensibility of the printer by allowing various interfaces to be defined that, in turn, allow applications or applets to interact with the printer in more robust manners.

It will be appreciated that the techniques and methods described herein include all forms of computer-readable media when such media contains instructions which, when executed by a processor or computer, implement the techniques and methods.

Exemplary Embodiment

Figure 3:
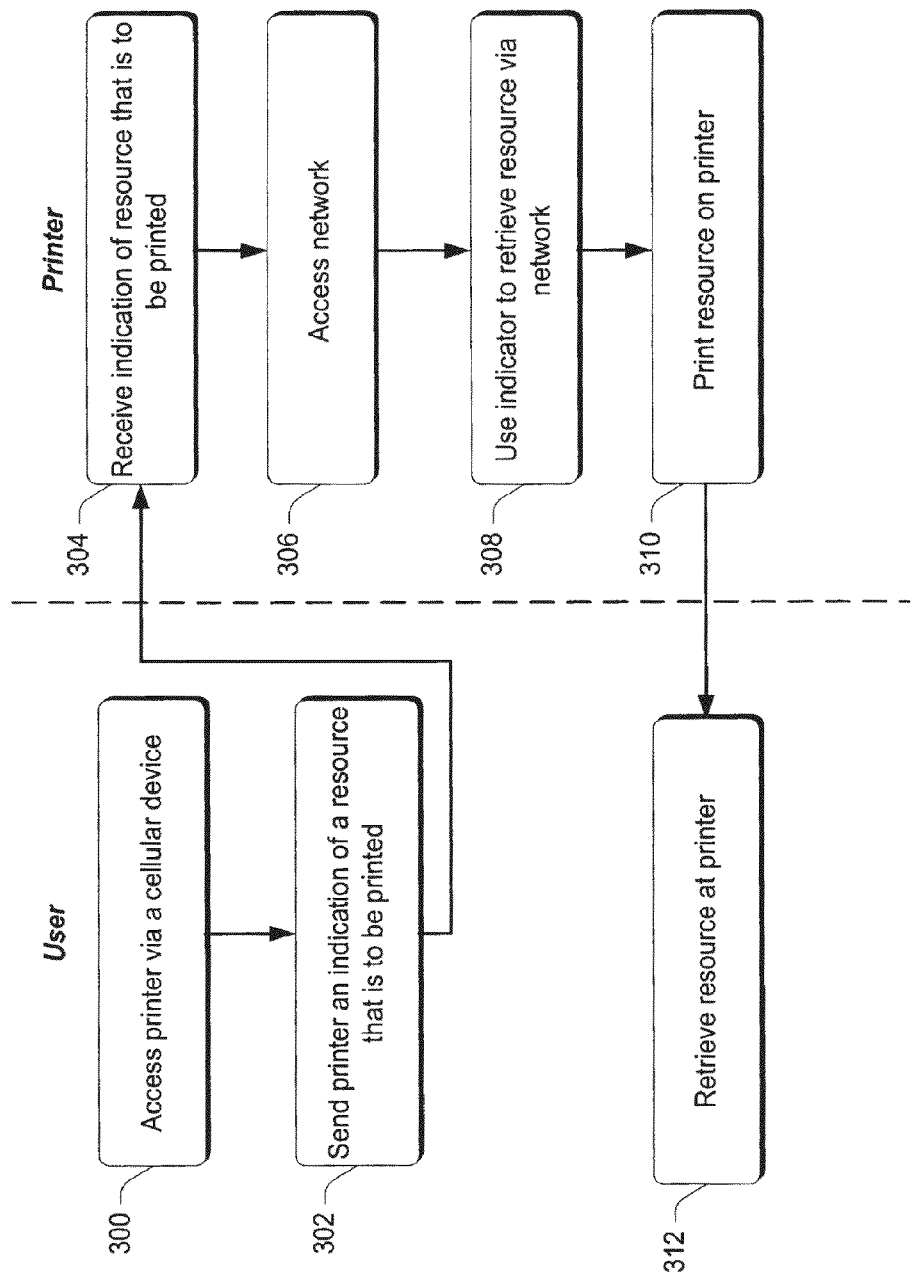
FIG. 3 is a flow diagram that describes steps in a method in accordance with one embodiment.

FIG. 3 is a flow diagram that describes steps in a method in accordance with one embodiment. The illustrated method is shown as having steps that are performed by a user or a user's cellular device, and steps that are performed by a cellularly-configured printer such as the one shown and described in connection with FIGS. 1 and 2. Hence, the left side of the flow diagram is designated "User" and the right side of the flow diagram is designated "Printer".

Step 300 accesses a cellularly-configured printer via a cellular device. This step can be performed in a number of different ways. For example, the user can, via their cell phone, call a telephone number associated with the printer. Alternately and/or additionally, the user can call a third party location service that can provide a location of the nearest cellularly-configured printer. An example of this is provided below. Step 302 sends the printer an indication of a resource that is to be printed by the printer. The indication can comprise any suitable indication that can be used as a resource identifier. In one embodiment, the indication can comprise the resource itself. In another embodiment, the indication can comprise a pointer or some other type of identifier such as a Universal Resource Locator (URL). Typically, a URL specifies a network location where the resource of interest is stored. Such location is typically accessible via the Internet or some other network. The manner of sending the indication to the printer is via cellular communication.

Step 304 receives the indication of the resource that is to be printed. The step is implemented by the printer cellularly receiving the communication from the user's cellular device. Note that one feature of the present embodiment is that the user's device and the printer to which the indication is sent need not have line of sight communication. Thus, as will become apparent below, the user can call any cellularly-configured printer at any cellularly-accessible location.

Step 306 accesses a network. This step can be implemented by, for example, using a cellular and/or network interface associated with the printer. Exemplary interfaces are described above in connection with FIGS. 1 and 2. Step 308 uses the indication to retrieve an associated resource via the network. For example, if the indication comprises an URL, then this step is implemented by following the URL to the resource of interest. Having retrieved or otherwise received the resource, step 310 prints the resource on the printer. Step 312 then retrieves the resource at the printer.

Implementation Example 1

Consider the printer configuration of FIG. 1, or a configuration in which the printer is embodied with a Web server. Assume now that a user has a cellular phone that is configured to receive email or text messages. Assume now that the user is sitting in a merchant's store, such as a coffee shop like Starbucks, and receives an important email message with an attachment. The user needs to have the email and the attachment for a meeting that they are to attend in 15 minutes just up the street. The user's office is unfortunately located all of the way across town.

Luckily for the user, Starbucks has begun to offer a printing service in their coffee shop. For a nominal fee (perhaps $0.50), a user can print a document on a printer located in their coffee shop. Accordingly, the user accesses the printer by calling a telephone number associated with the Starbucks printer and provides the printer with an indication of the email message and attachment that is to be printed. In this case, the user might provide an URL associated with the email message. Using the URL that it receives, the printer accesses the Internet and uses the URL to retrieve the user's email message and attachment. Once retrieved, the printer prints the email message and the attachment, whereupon the user retrieves the document and is off to their meeting. Starbuck's printing fee can be charged to the user's monthly cellular bill. Alternately or additionally, the user can pay the charge when they pick up their printed document. In one embodiment, the cellular telephone network provider that implements the cellular telephone network 104 (FIG. 1) can monitor for print services that are cellularly provided and by, for example, a pre-arrangement with the customer, charge the customer and/or the print service provider, a small fee for the service.

It is to be appreciated that the user, the printer, and the network location at which the user's resource is stored can engage in a secure dialog so that the user can authenticate him or herself to the network location and have their resource securely sent to the printer. For example, the user may have a prearranged password that they use in connection with the network location. The user might, through a dialog with the printer, provide the printer with their password encrypted with a public key associated with the printer. The printer can then decrypt the password with its private key and can then re-encrypt it with a public key associated with the network location. Once transmitted to the network location, the network location can decrypt the user's password using its own private key. Once the password and any associated message (including, for example, the URL) is decrypted by the network location, the network location can access the resource, encrypt it with the printer's public key, and transmit it to the printer. Upon receipt, the printer can decrypt the resource using its private key and can print it for the user. This example is provided to illustrate but one way in which measures can be provided for ensuring the confidentiality of the communications between the user, the printer, and the network location. Of course, other security measures can be provided without departing from the spirit and scope of the claimed subject matter.

Implementation Example 2

Assume the same scenario as described above, only this time the user has just parked their car in a parking garage next to the building in which their meeting is to take place. As soon as the user parks their car, they check their text messages on their cellular phone only to discover that they have received an urgent email with an attachment that is needed for the meeting. In this example, the user can call a third party service on their cellular phone. The third party service knows the user's location based on the location of the user's cell phone within the cell system. The user then queries the third party service as to the location of the nearest cellularly-configured printer that is available for public use. After discovering that the closest cellularly-configured printer is at the Starbucks coffee shop one street over, the user calls the Starbucks printer and provides the printer with an indication (i.e. URL) associated with the document that they need. As the user makes their way to the Starbucks, the printer is already using the URL to access the Internet and retrieve and print the user's document. When the user shows up at the Starbucks, their document is waiting in a folder for them behind the counter.

In this example, the user was able to take advantage of a cellularly-configured and networked printer, even though they did not immediately know where the printer was. Additionally, the user could print their document even though there was no line-of-sight communication with the printer.

Implementation Example 3

Assume that the user has a cell phone with imaging capabilities. Specifically, the cell phone is able to show, on its display, pictures or other images. The Nokia 6650 cell phone is but one example of a cell phone that can display images such as pictures. Assume that the user is sitting at the very same Starbucks with a friend and wants to show the friend a particular picture they recently took while visiting the Grand Canyon. Although the cell resolution is adequate to give the user's friend a general view of the picture, it would be much nicer to print a picture for the friend. Luckily, Starbucks has a high quality printer with color capabilities. In much the same way that the user was able to print their email message in Implementation Example 1 above, the user accesses the printer and provides the printer with an indication (e.g. a URL) of the picture of interest. The printer then printer retrieves the picture and prints it for the user.

The above-described examples provide but a few examples of implementation scenarios that can benefit from the described methods and systems. These scenarios are not to be used to limit application of the claimed subject matter.

It is to be appreciated and understood that the described embodiments can be utilized in connection with any suitable cellular standards, topologies and the like. For example, there are a number of worldwide standards and topologies such as TDMA, CDMA, GSM (900, 1800, and 1900), IDEN, CDPD, IMODE, and all associated bands. Any and/or all of these, as well as other existing and yet-to-emerge standards and topologies can be used without departing from the spirit and scope of the claimed subject matter.

CONCLUSION

There are various advantages associated with one or more of the embodiments described above. For example, in some embodiments, traditional cable-based network connections can be eliminated. This means that the printer can be networked from many different locations thus providing a degree of flexibility that is missing from the traditional cable-based network scenarios. Another advantage is that the technology to access the functionality of the described embodiments— i.e. a user's cell phone—already exists. Thus, there is a desirable degree of so-called legacy support. Specifically, older cell phones with older technology can access the described functionality by virtue of being networked with the printer via a cellular telephone network. Thus, a very large potential consumer base is immediately available.

Additionally, this technology is, from the user's standpoint, very easy to use. They simply call the printer through the cellular telephone network. Further, various embodiments can span multiple networks worldwide. Further, the process of printer discovery is fairly straight forward and, by virtue of the fact that it can be implemented on the cell service provider side, removes most if not all of the burden from the user.

Another interesting and useful feature of one or more of the described embodiments is that various printing services can be offered for a fee. By offering fee-based, cellular printing services, the foundation for many useful business models is provided. The result of such emergent business models is that consumers will be able to partake of a fairly robust collection of services that bring convenience and flexibility into their lives.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A cellular device programmed to selectively send to a printer, with which the cellular device communicates via a cellular network, an indication of a resource that is to be printed by the printer, wherein said cellular device uses a phone number associated with said printer to make a cellular telephone call to a cellular port supported by a cellular card of said printer to deliver said indication of said resource to said printer.

2. A method comprising:
   accessing a cellularly configured printer with a cellular device, said accessing comprising calling a phone number associated with a cellular interface of the printer;
   cellularly sending the printer an indication of a resource that is to be printed by the printer; and
   querying a third party service using the cellular device to determine the location of a nearest cellularly-configured printer, wherein the third party service knows a current location of the cellular device based on operation of the cellular device within a distributed cellular system.

3. A method comprising:
   accessing a cellularly configured printer with a cellular device, said accessing comprising calling a phone number associated with a cellular interface of the printer; and
   cellularly sending the printer an indication of a resource that is to be printed by the printer;
   wherein said cellular device uses said phone number to make a cellular telephone call to a cellular port supported by a cellular card of said printer to deliver said indication of said resource to said printer.

* * * * *